United States Patent
Wayda et al.

(10) Patent No.: US 7,975,115 B2
(45) Date of Patent: Jul. 5, 2011

(54) METHOD AND APPARATUS FOR SEPARATING SNAPSHOT PRESERVED AND WRITE DATA

(75) Inventors: James George Wayda, Laguna Niguel, CA (US); Kent Lee, Ladera Ranch, CA (US); Ngoclan Thi Vu, Irvine, CA (US); Elizabeth G. Rodriguez, Carlsbad, CA (US)

(73) Assignee: Dot Hill Systems Corporation, Longmont, CO (US)

( * ) Notice: Subject to any disclaimer, the term of this patent is extended or adjusted under 35 U.S.C. 154(b) by 500 days.

(21) Appl. No.: 11/779,965

(22) Filed: Jul. 19, 2007

(65) Prior Publication Data

US 2008/0256141 A1 Oct. 16, 2008

Related U.S. Application Data

(63) Continuation-in-part of application No. 11/734,081, filed on Apr. 11, 2007, now Pat. No. 7,716,183.

(51) Int. Cl.
G06F 12/16 (2006.01)

(52) U.S. Cl. ............... 711/162; 711/E12.103; 707/638; 707/639

(58) Field of Classification Search ............ 711/162; 707/203, 638, 639, 999.203
See application file for complete search history.

(56) References Cited

U.S. PATENT DOCUMENTS

| | | | |
|---|---|---|---|
| 5,551,046 A | 8/1996 | Mohan et al. | |
| 5,778,189 A | 7/1998 | Kimura et al. | |
| 5,812,843 A | 9/1998 | Yamazaki et al. | |
| 5,963,962 A | 10/1999 | Hitz et al. | |
| 6,073,209 A | 6/2000 | Bergsten et al. | |
| 6,289,356 B1 | 9/2001 | Hitz et al. | |
| 6,292,808 B1 | 9/2001 | Obermarck et al. | |
| 6,341,341 B1 * | 1/2002 | Grummon et al. ............ 711/162 |
| 6,548,634 B1 | 4/2003 | Balinger et al. | |
| 6,557,079 B1 | 4/2003 | Mason, Jr. et al. | |
| 6,594,744 B1 | 7/2003 | Humlicek et al. | |
| 6,615,223 B1 | 9/2003 | Shih et al. | |
| 6,771,843 B1 | 8/2004 | Huber et al. | |
| 6,907,512 B2 | 6/2005 | Hill et al. | |
| 7,047,380 B2 | 5/2006 | Tormasov et al. | |

(Continued)

FOREIGN PATENT DOCUMENTS

CA 2165912 6/1997

(Continued)

OTHER PUBLICATIONS

International Preliminary Report on Patentability and Written Opinion from the PCT dated Oct. 22, 2009 with regard to corresponding PCT Application No. PCT/US/08/57326, 10 pages.

(Continued)

Primary Examiner — Michael Krofcheck
(74) Attorney, Agent, or Firm — Thomas J. Lavan; Matthew R. Ellsworth (57) ABSTRACT

A method and device for managing snapshot data is provided. Snapshots may be created having a preserved data area and a write data area. The preserved data area is used to maintain snapshot data corresponding to the point-in-time when the snapshot was created while the write data area is used to facilitate host read/write access to the snapshot. By maintaining two separate areas, the snapshot can be written to without altering the point-in-time representation of the snapshot.

18 Claims, 7 Drawing Sheets

U.S. PATENT DOCUMENTS

| | | | |
|---|---|---|---|
| 7,050,457 | B2 | 5/2006 | Erfurt et al. |
| 7,100,089 | B1 | 8/2006 | Phelps |
| 7,165,156 | B1 | 1/2007 | Cameron et al. |
| 7,191,304 | B1 | 3/2007 | Cameron et al. |
| 7,194,550 | B1 | 3/2007 | Chamdani et al. |
| 7,206,961 | B1 | 4/2007 | Mutalik et al. |
| 7,243,157 | B2 | 7/2007 | Levin et al. |
| 7,313,581 | B1 | 12/2007 | Bachmann et al. |
| 7,363,444 | B2 | 4/2008 | Ji et al. |
| 7,373,366 | B1 | 5/2008 | Chatterjee et al. |
| 7,426,618 | B2 | 9/2008 | Vu et al. |
| 7,526,640 | B2 | 4/2009 | Bejarano et al. |
| 7,593,973 | B2 | 9/2009 | Lee et al. |
| 2001/0039629 | A1 | 11/2001 | Feague et al. |
| 2002/0083037 | A1 | 6/2002 | Lewis et al. |
| 2002/0091670 | A1 | 7/2002 | Hitz et al. |
| 2002/0099907 | A1 | 7/2002 | Castelli et al. |
| 2002/0112084 | A1 | 8/2002 | Deen et al. |
| 2003/0154314 | A1 | 8/2003 | Mason et al. |
| 2003/0158863 | A1 | 8/2003 | Haskin |
| 2003/0167380 | A1 | 9/2003 | Green |
| 2003/0188223 | A1 | 10/2003 | Alexis et al. |
| 2003/0191745 | A1 | 10/2003 | Jiang |
| 2003/0229764 | A1 | 12/2003 | Ohno et al. |
| 2004/0030727 | A1 | 2/2004 | Armangau |
| 2004/0030846 | A1 | 2/2004 | Armangau |
| 2004/0030951 | A1 | 2/2004 | Armangau |
| 2004/0034647 | A1 | 2/2004 | Paxton et al. |
| 2004/0054131 | A1 | 3/2004 | Balinger et al. |
| 2004/0093555 | A1 | 5/2004 | Therrien et al. |
| 2004/0117567 | A1* | 6/2004 | Lee et al. ............... 711/154 |
| 2004/0133718 | A1 | 7/2004 | Kodama et al. |
| 2004/0172509 | A1 | 9/2004 | Takeda et al. |
| 2004/0204071 | A1 | 10/2004 | Bahl |
| 2004/0260673 | A1 | 12/2004 | Hitz et al. |
| 2004/0267836 | A1 | 12/2004 | Armangau et al. |
| 2005/0004979 | A1 | 1/2005 | Berkowitz et al. |
| 2005/0044088 | A1 | 2/2005 | Lindsay et al. |
| 2005/0065985 | A1* | 3/2005 | Tummala et al. ........... 707/201 |
| 2005/0066128 | A1 | 3/2005 | Yagisawa et al. |
| 2005/0071393 | A1 | 3/2005 | Ohno et al. |
| 2005/0122791 | A1 | 6/2005 | Hajeck |
| 2005/0166022 | A1 | 7/2005 | Watanabe |
| 2005/0182910 | A1 | 8/2005 | Stager et al. |
| 2005/0193180 | A1 | 9/2005 | Fujibayashi et al. |
| 2005/0198452 | A1 | 9/2005 | Watanabe |
| 2005/0240635 | A1 | 10/2005 | Kapoor |
| 2005/0246397 | A1 | 11/2005 | Edwards et al. |
| 2005/0246503 | A1 | 11/2005 | Fair |
| 2006/0020762 | A1 | 1/2006 | Urmston |
| 2006/0053139 | A1 | 3/2006 | Marzinski et al. |
| 2006/0064541 | A1* | 3/2006 | Kano ........................ 711/114 |
| 2006/0107006 | A1 | 5/2006 | Green et al. |
| 2006/0155946 | A1* | 7/2006 | Ji ............................... 711/162 |
| 2006/0212481 | A1* | 9/2006 | Stacey et al. ............. 707/104.1 |
| 2006/0271604 | A1 | 11/2006 | Shoens |
| 2007/0038703 | A1 | 2/2007 | Tendjoukian |
| 2007/0055710 | A1* | 3/2007 | Malkin ....................... 707/202 |
| 2007/0094466 | A1 | 4/2007 | Sharma et al. |
| 2007/0100808 | A1 | 5/2007 | Balogh |
| 2007/0143563 | A1 | 6/2007 | Pudipeddi et al. |
| 2007/0185973 | A1 | 8/2007 | Wayda et al. |
| 2007/0186001 | A1 | 8/2007 | Wayda et al. |
| 2007/0198605 | A1 | 8/2007 | Saika |
| 2007/0266066 | A1 | 11/2007 | Kapoor et al. |
| 2007/0276885 | A1 | 11/2007 | Valiyaparambil |
| 2008/0082593 | A1* | 4/2008 | Komarov et al. ........... 707/204 |
| 2008/0177954 | A1 | 7/2008 | Lee et al. |
| 2008/0177957 | A1 | 7/2008 | Lee et al. |
| 2008/0256311 | A1 | 10/2008 | Lee et al. |
| 2008/0281875 | A1 | 11/2008 | Wayda et al. |
| 2008/0281877 | A1 | 11/2008 | Wayda et al. |
| 2008/0320258 | A1 | 12/2008 | Wayda et al. |

FOREIGN PATENT DOCUMENTS

| | | |
|---|---|---|
| EP | 1003103 | 5/2000 |
| WO | WO9429807 | 12/1994 |
| WO | WO 0250716 | 6/2002 |
| WO | WO2005111773 | 11/2005 |
| WO | WO2005111802 | 11/2005 |

OTHER PUBLICATIONS

Office Action in U.S. Appl. No. 11/561,512, Dec. 10, 2009.
Official Action for U.S. Appl. No. 11/747,109, mailed Dec. 14, 2009.
Official Action for U.S. Appl. No. 11/747,127, mailed Jan. 6, 2010.
Official Action for U.S. Appl. No. 11/624,565, mailed Nov. 30, 2009.
Written Opinion from the PCT dated Mar. 27, 2007 with regard to corresponding PCT Application No. PCT/US/06/32506, 10 pages.
International Search Report from the PCT dated Mar. 27, 2007 with regard to corresponding PCT Application No. PCT/US/06/32506, 3 pages.
International Preliminary Report on Patentability and Written Opinion from the PCT dated Mar. 20, 2008 with regard to corresponding PCT Application No. PCT/US/06/32506, 10 pages.
Notice of Allowance in U.S. Appl. No. 11/277,738, Mar. 20, 2008, 6 pages.
Office Action in Application in U.S. Appl. No. 11/277,738, Dec. 6, 2007, 9 pages.
Office Action in U.S. Appl. No. 11/277,738, Jul. 31, 2007, 8 pages.
Office Action in Application in U.S. Appl. No. 11/277,738, Apr. 3, 2007, 14 pages.
Analysis from foreign associate dated Oct. 22, 2009 from 1st office action from Chinese patent office for application 200680032724.8.
Office Action in U.S. Appl. No. 11/561,512, Oct. 30, 2009, 9 pages.
Official Action for U.S. Appl. No. 11/747,109, mailed Sep. 21, 2009.
Official Action for U.S. Appl. No. 11/747,127, mailed Oct. 6, 2009.
Official Action for U.S. Appl. No. 11/624,524, mailed Sep. 16, 2009.
Official Action for U.S. Appl. No. 11/734,081, mailed Aug. 21, 2009.
Office Action in U.S. Appl. No. 11/561,512, Apr. 3, 2009, 11 pages.
Official Action for U.S. Appl. No. 11/561,512, mailed Jun. 25, 2009.
Notice of Allowance for U.S. Appl. No. 11/560,174, mailed Feb. 9, 2009.
Official Action for U.S. Appl. No. 11/560,174, mailed Sep. 5, 2008.
Official Action for U.S. Appl. No. 11/747,109, mailed Mar. 9, 2009.
Official Action for U.S. Appl. No. 11/747,127, mailed Apr. 15, 2009.
Official Action for U.S. Appl. No. 11/624,565, mailed Mar. 30, 2009.
Official Action for U.S. Appl. No. 11/624,524, mailed Dec. 11, 2008.
Official Action for U.S. Appl. No. 11/624,524, mailed Jun. 16, 2009.
Official Action for U.S. Appl. No. 11/734,081, mailed May 8, 2009.
International Search Report from the PCT dated Aug. 7, 2008 with regard to corresponding PCT Application No. PCT/US/08/57326, 2 pages.
Written Opinion from the PCT dated Aug. 7, 2008 with regard to corresponding PCT Application No. PCT/US/08/57326, 6 pages.
Office Action in U.S. Appl. No. 11/561,512, Mar. 18, 2010.
Official Action for U.S. Appl. No. 11/945,940, mailed Mar. 5, 2010.
Official Action for U.S. Appl. No. 11/747,109, mailed Mar. 30, 2010.
Official Action for U.S. Appl. No. 11/624,524, mailed Jan. 26, 2010.
Notice of Allowance for U.S. Appl. No. 11/734,081, mailed Feb. 2, 2010.
Notice of Allowance for U.S. Appl. No. 11/734,081, mailed Mar. 10, 2010.
Notice of Allowance for U.S. Appl. No. 11/747,127, mailed May 14, 2010.
Notice of Allowance for U.S. Appl. No. 11/747,127, mailed Jun. 2, 2010.
Notice of Allowance for U.S. Appl. No. 11/747,127, mailed Jun. 15, 2010.
Official Action for U.S. Appl. No. 11/768,127, mailed Apr. 2, 2010.
Official Action for U.S. Appl. No. 11/768,127, mailed Jun. 1, 2010.
Notice of Allowance for U.S. Appl. No. 11/945,940, mailed Jun. 18, 2010.
Examiner's answer in U.S. Appl. No. 11/561,512, Sep. 2, 2010.
Notice of Allowance for U.S. Appl. No. 11/945,940, mailed Jul. 13, 2010.
Notice of Allowance for U.S. Appl. No. 11/747,127, mailed Jul. 13, 2010.
Notice of Allowance for U.S. Appl. No. 11/624,565, mailed Sep. 14, 2010.

Examiner's answer for U.S. Appl. No. 11/624,524, mailed Sep. 10, 2010.
Official Action for U.S. Appl. No. 12/780,891, mailed Sep. 20, 2010.
Office Action in U.S. Appl. No. 11/561,680, Nov. 5, 2010.
Notice of Allowance for U.S. Appl. No. 11/624,565, mailed Sep. 29, 2010.
Official Action for U.S. Appl. No. 11/768,127, mailed Nov. 3, 2010.
Office Action in U.S. Appl. No. 11/561,680, Apr. 15, 2011.
Official Action for U.S. Appl. No. 11/747,109, mailed Mar. 18, 2011.
Notice of Allowance for U.S. Appl. No. 11/747,109, mailed Apr. 29, 2011.
Official Action for U.S. Appl. No. 12/780,891, mailed Mar. 25, 2011.

* cited by examiner

METHOD AND APPARATUS FOR SEPARATING SNAPSHOT PRESERVED AND WRITE DATA

CROSS REFERENCE TO RELATED APPLICATIONS

This application is a continuation-in-part of application Ser. No. 11/734,081, filed Apr. 11, 2007, entitled "Snapshot Preserved Data Cloning," the entire disclosure of which is hereby incorporated herein by reference.

FIELD OF THE INVENTION

The present invention is directed to data storage management. In particular, the present invention is directed to methods and apparatuses for managing snapshot data.

BACKGROUND

The need to store digital files, documents, pictures, images and other data continues to increase rapidly. In connection with the electronic storage of data, various data storage systems have been devised for the rapid and secure storage of large amounts of data. Such systems may include one or a plurality of storage devices that are used in a coordinated fashion. Systems in which data can be distributed across multiple storage devices such that data will not be irretrievably lost if one of the storage devices (or in some cases, more than one storage device) fails are also available. Systems that coordinate operation of a number of individual storage devices can also provide improved data access and/or storage times. Examples of systems that can provide such advantages can be found in the various RAID (redundant array of independent disks) levels that have been developed. Whether implemented using one or a plurality of storage devices, the storage provided by a data storage system can be treated as one or more storage volumes.

In order to facilitate the availability of desired data, it is often advantageous to maintain different versions of a data storage volume. Indeed, data storage systems are available that can provide at least limited data archiving through backup facilities and/or snapshot facilities. The use of snapshot facilities greatly reduces the amount of storage space required for archiving large amounts of data.

Snapshots provide a versatile feature that is useful for data recovery operations, such as backup and recovery of storage elements. However, traditional snapshots are read-only accessible and their contents cannot be modified, thereby rendering their use somewhat limited, particularly for operating systems and applications that do not have a notion of a read-only data store (e.g., a read-only file system) and that expect to write metadata at any time that the file system is accessible. When a storage element that is held in a snapshot is exported to a client or host and contains the data for such a problematic file system, an issue arises in that the host may attempt to write data to the read-only image. This is a fundamental issue in the design of a reliable system for backups. In general, once a backup image is made via a mechanism like a sparse snapshot, that image should be maintained as a point-in-time representation of the storage volume. A controller typically modifies snapshot data by what is known as a copy-on-write (COW) operation. The COW operation determines when a change to a storage volume is going to occur and then determines if the targeted blocks of that storage volume have changed since a snapshot was taken. If the blocks have not changed since the snapshot was taken, then the controller proceeds by copying the original contents of those blocks and writing them to the snapshot data prior to changing the storage volume. The COW operation ensures that the data from the storage volume at the point-in-time that a snapshot was taken either resides on the storage volume or on the snapshot. The controller therefore changes the snapshot only when doing so is required to preserve the data that was on the storage volume at the time the snapshot was taken, but that will be overwritten on the storage volume.

Direct modification of a snapshot image (e.g., direct modification by a client or host rather than a controller performing a COW operation) could have serious consequences. Such consequences may include the fact that the data of the snapshot is no longer a point-in-time copy and a consistent image of the storage volume may no longer be available for subsequent recovery operations. Accordingly, most snapshot facilities do not allow a host to write data directly to a snapshot without modifying the original data of the snapshot. Thus, many snapshot applications must be used for backup purposes only, where the snapshot cannot be mounted for write access or modification purposes. Furthermore, in some operating systems, a snapshot cannot be mounted as read-only.

The reason for this limited functionality is that traditional sparse snapshot designs employ a single data area to contain all data that is preserved in the snapshot or written to the snapshot by a host system. Although this spare snapshot configuration helps reduce the amount of memory used by a snapshot it severely limits the functionality available to snapshot applications. It would be useful to have a snapshot that provides enhanced snapshot functionality while making efficient use of data storage space.

SUMMARY

The present invention is directed to solving these and other problems and disadvantages of the prior art. In accordance with embodiments of the present invention, a service for efficiently managing snapshot data is provided. The method generally comprises receiving a command to create a snapshot at a first point-in-time and in response to receiving the command, allocating a first set of memory addresses for storage of preserved data in association with the snapshot and allocating a second set of memory addresses for storage of write data. In accordance with at least some embodiments of the present invention, the second set of memory addresses are host writeable whereas the first set of memory addresses are not. This allows a user to write data directly to the snapshot using the second set of memory addresses without altering the point-in-time representation of the snapshot maintained by the first set of memory addresses. Furthermore, the second set of memory addresses is not populated with write data unless a user writes directly to the snapshot, thereby reducing the amount of data storage space needed to facilitate the write functionality.

In accordance with at least some embodiments of the present invention, a device for managing snapshot data is provided. The device generally comprises an input operable to receive instructions to create a snapshot of a master volume at a first point-in-time and a snapshot application operable to create a first snapshot in response to receiving the instructions, wherein the first snapshot comprises two separate data storage areas for storing different instances of data corresponding to a common data block range on the master volume. A data storage device is also provided to store snapshots created in accordance with embodiments of the present invention.

Additional features and advantages of embodiments of the present invention will become more readily apparent from the following description, particularly when taken together with the accompanying drawings.

DETAILED DESCRIPTION

In accordance with embodiments of the present invention, a snapshot is a block level point-in-time representation of data on a storage volume. The data is essentially frozen in time at the instant that the snapshot is taken. Although data on the storage volume may change as a result of write operations, the data within the snapshot will remain constant and frozen in time at the instant that the snapshot was taken. In order to preserve snapshot data, a backing store, also known as a snap pool, is used to store data that is not otherwise represented in the storage volume and snapshot metadata. All data and metadata associated with the snapshot is stored in the backing store. In accordance with embodiments of the present invention, data is stored within the snapshot in "chunks" or "block ranges." A chunk is equivalent to a number of Logical Block Addresses (LBAs). Alternatively or in addition, data can be stored within subchunks. A subchunk is a fixed size subset of a chunk. Pointers, table entries, or other data structures can be used to identify the location of a chunk in the backing store.

Figure 1:
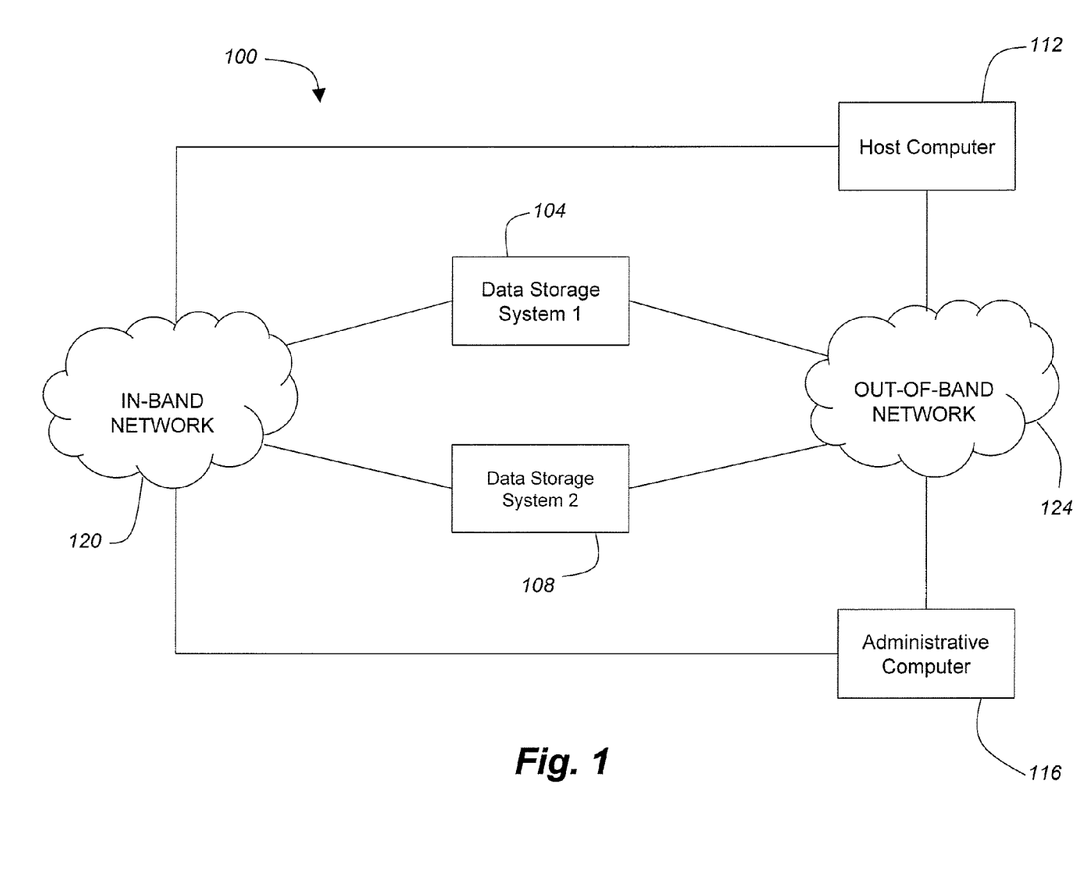
FIG. 1 is a functional block diagram depicting components of an electronic data system incorporating one or more data storage systems in accordance with embodiments of the present invention.

FIG. 1 is a block diagram depicting an electronic data system 100 in accordance with embodiments of the present invention incorporating a first data storage system 104 and a second data storage system 108. The electronic data system 100 may also include one or more host processors, computers or computer systems 112. In addition, the electronic data system 100 may include or may be interconnected to an administrative computer 116. As will be appreciated by one of skill in the art after consideration of the present disclosure, embodiments of the present invention have application in association with single or multiple hosts 112 in storage area network (SAN) or direct connect environments.

The data storage systems 104, 108 are typically interconnected to one another through an in-band network 120. The in-band network 120 may also interconnect the data storage systems 104, 108 to a host computer 112 and/or an administrative computer 116. The electronic data system 100 may also include an out-of-band network 124 interconnecting some or all of the electronic data system 100 nodes 104, 108, 112 and/or 116. For example, one or more host computers 112 are connected to each data storage system 104, 108. For instance, a first data storage system 104 is connected to a second data storage system 108 across some distance by a Fibre Channel or a TCP/IP network 120, and each of these data storage systems 104, 108 is connected to a host computer 112 through an in-band 120 and/or an out-of-band 124 network.

The in-band or storage area network 120 generally functions to transport data between data storage systems 104 and/or 108 and host devices 112, and can be any data pipe capable of supporting multiple initiators and targets. Accordingly, examples of in-band networks 120 include Fibre Channel (FC), iSCSI, parallel SCSI, Ethernet, ESCON, or FICON connections or networks, which may typically be characterized by an ability to transfer relatively large amounts of data at medium to high bandwidths. The out-of-band network 124 generally functions to support the transfer of communications and/or commands between various network nodes, such as data storage resource systems 104, 108, host computer 112, and/or administrative computers 116, although such data may also be transferred over the in-band communication network 120. Examples of an out-of-band communication network 124 include a local area network (LAN) or other transmission control protocol/Internet protocol (TCP/IP) network. In general, the out-of-band communication network 124 is characterized by an ability to interconnect disparate nodes or other devices through uniform user interfaces, such as a web browser. Furthermore, the out-of-band communication network 124 may provide the potential for globally or other widely distributed management of data storage systems 104, 108 via TCP/IP.

Every electronic data system node or computer 104, 108, 112 and 116, need not be interconnected to every other node or device through both the in-band network 120 and the out-of-band network 124. For example, no host computer 112 needs to be interconnected to any other host computer 112, data storage system 104, 108, or administrative computer 116 through the out-of-band communication network 124, although interconnections between a host computer 112 and other devices 104, 108, 116 through the out-of-band communication network 124 are not prohibited. As another example, an administrative computer 116 may be interconnected to at least one storage system 104 or 108 through the out-of-band communication network 124. An administrative computer 116 may also be interconnected to the in-band network 120 directly, although such an interconnection is not required. For example, instead of a direct connection, an administrator computer 116 may communicate with a controller of a data storage system 104, 108 using the in-band network 120.

In general, a host computer 112 exchanges data with one or more of the data storage systems 104, 108 in connection with the performance of the execution of application programming, whether that application programming concerns data management or otherwise. Furthermore, an electronic data system 100 may include multiple host computers 112. An administrative computer 116 may provide a user interface for controlling aspects of the operation of the storage systems 104, 108. The administrative computer 116 may be interconnected to the storage system 104, 108 directly, and/or through a bus or network 120 and/or 124. In accordance with still other embodiments of the present invention, an administrative computer 116 may be integrated with a host computer 112. In addition, multiple administrative computers 116 may be provided as part of the electronic data system 100. Furthermore, although two data storage systems 104, 108 are shown in FIG. 1, an electronic data system 100 may include more than two data storage systems or may include a single data storage system.

Figure 2:
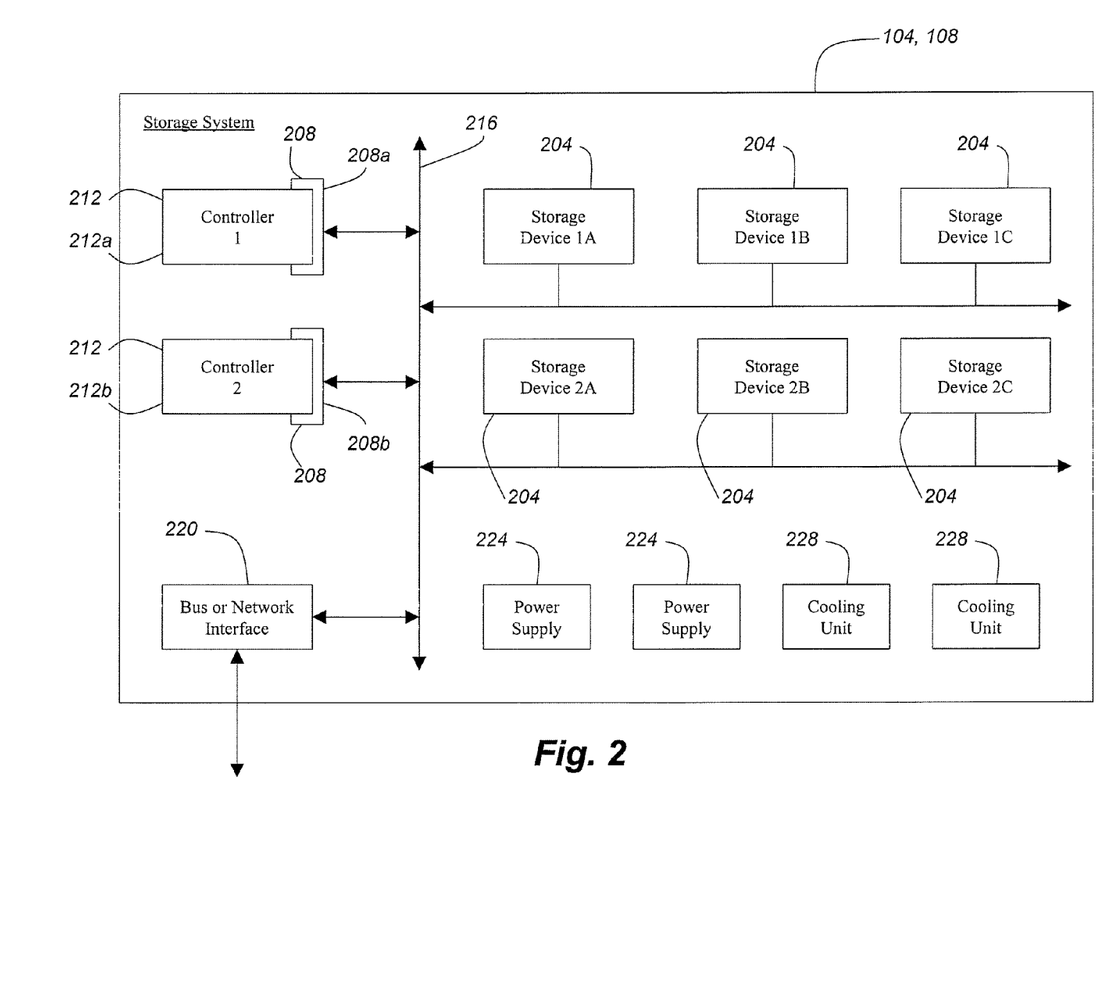
FIG. 2 is a block diagram depicting components of a data storage system in accordance with embodiments of the present invention.

FIG. 2 illustrates components that may be included in a data storage system 104, 108 in accordance with embodiments of the present invention. In general, the data storage system 104, 108 includes a number of storage devices 204. Examples of storage devices 204 include hard disk drives, such as serial advanced technology attachment (SATA), small computer system interface (SCSI), serial attached SCSI (SAS), Fibre Channel (FC), or parallel advanced technology attached (PATA) hard disk drives. Other examples of storage devices 204 include magnetic tape storage devices, optical storage devices or solid state disk devices. Furthermore, although a number of storage devices 204 are illustrated, it should be appreciated that embodiments of the present invention are not limited to any particular number of storage devices 204, and that a lesser or greater number of storage devices 204 may be provided as part of a data storage system 104. As can be appreciated by one of skill in the art, one or more arrays and/or array partitions, hereinafter referred to as logical unit numbers (LUNs) comprising a storage volume, may be established on the data storage devices 204. As can be further appreciated by one of skill in the art, a LUN may be implemented in accordance with any one of the various array levels or other arrangements for storing data on one or more storage devices 104. As can also be appreciated by one of skill in the art, the storage devices 204 may contain data comprising a master storage volume, which may correspond to a LUN, in addition to one or more snapshots of the master storage volume taken at different times. As can further be appreciated by one of skill in the art, snapshots may comprise metadata and data stored in a backing store on the storage devices 204. As can also be appreciated by one of skill in the art, the storage devices 204 contain data comprising a master storage volume, which may correspond to a LUN, and one or more snapshots of the storage volume taken at different times. In one embodiment, the snapshots may be mapped to the LUNs and stored on a backing store. However, the backing store, which also occupies an array and/or array partition, does not have a LUN number assigned to it, thus making the backing store invisible to a host computer 112 and/or administrative computer 116.

A data storage system 104, 108, in accordance with embodiments of the present invention, may be provided with a first controller slot 208a. In addition, other embodiments may include additional controller slots, such as a second controller slot 208b. As can be appreciated by one of skill in the art, a controller slot 208 may comprise a connection or set of connections to enable a controller 212 to be operably interconnected to other components of the data storage system 104, 108. Furthermore, a data storage system 104, 108 in accordance with embodiments of the present invention includes at least one controller 212a. For example, while the data storage system 104, 108 is operated in a single controller, non-failover mode, the data storage system 104, 108 may include exactly one controller 212. A data storage system 104, 108 in accordance with other embodiments of the present invention may be operated in a dual redundant active-active controller mode by providing a second controller 212b. When a second controller 212b is used in addition to a first controller 212a, the second controller slot 208b receives the second controller. As can be appreciated by one of skill in the art, the provision of two controllers, 212a and 212b, permits data to be mirrored between the controllers 212a-212b, providing redundant active-active controller operation.

One or more busses or channels 216 are generally provided to interconnect a controller or controllers 212 through the associated controller slot or slots 208 to the storage devices 204. Furthermore, while illustrated as a single shared bus or channel 216, it can be appreciated that a number of dedicated and/or shared buses or channels may be provided. Additional components that may be included in a data storage system 104 include one or more power supplies 224 and one or more cooling units 228. In addition, a bus or network interface 220 may be provided to interconnect the data storage system 104, 108 to the bus or network 112, and/or to a host computer 108 or administrative computer 116.

Although illustrated as a complete RAID system in FIG. 2, it should be appreciated that the data storage system 104, 108 can comprise one or more storage volumes implemented in various other ways. For example, the data storage system 104, 108 may comprise a hard disk drive or other storage device 204 connected or associated with a server or a general-purpose computer. As further examples, the storage system 104 may comprise a Just a Bunch of Disks (JBOD) system or a Switched Bunch of Disks (SBOD) system.

Figure 3:
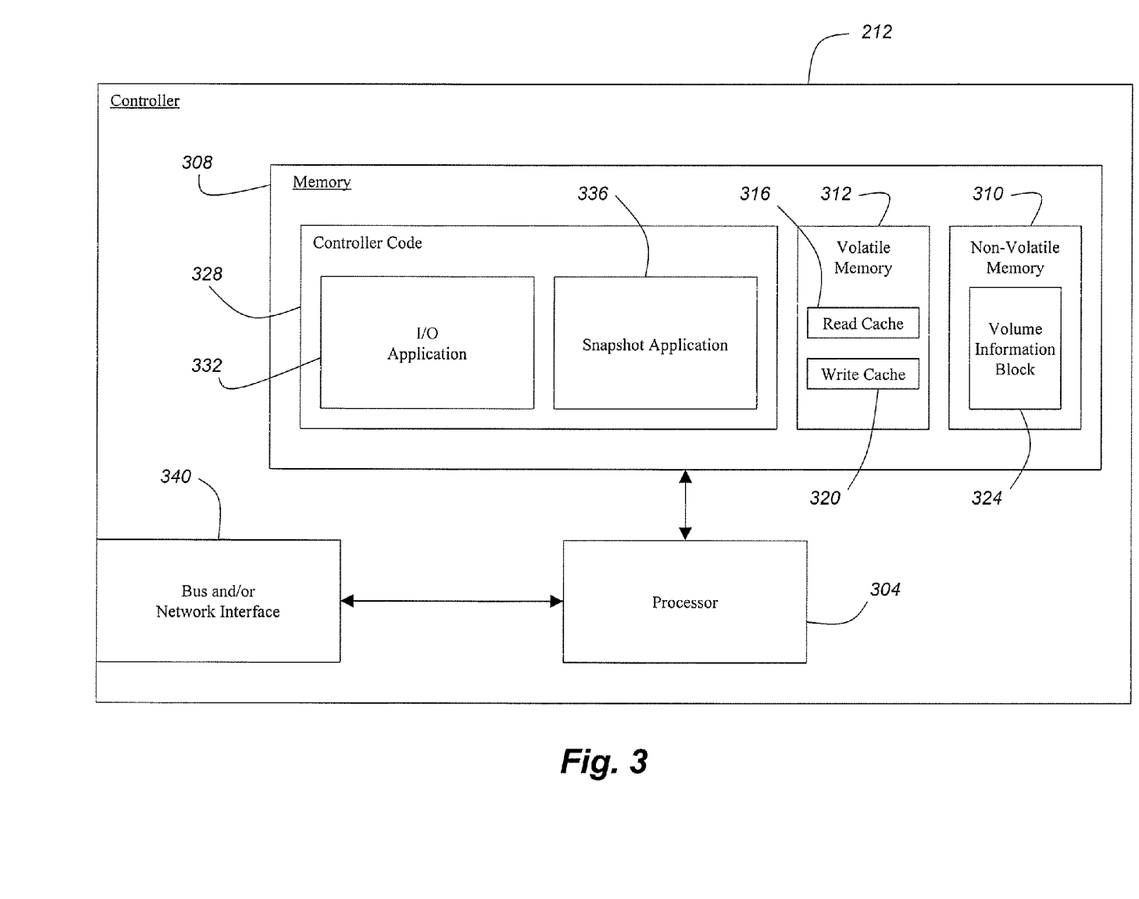
FIG. 3 is a block diagram depicting components of a storage controller in accordance with embodiments of the present invention.

FIG. 3 illustrates aspects of a storage controller 212 in accordance with embodiments of the present invention. In general, a storage controller 212 includes a processor subsystem 304 capable of executing instructions for performing, implementing and or controlling various controller 212 functions. Such instructions may include instructions for implementing aspects of a snapshot management method and apparatus. Furthermore, such instructions may be stored as software and/or firmware. As can be appreciated by one of skill in the art, operations concerning the generation of parity data or other operations may be performed using one or more hardwired and/or programmable logic circuits provided as part of the processor subsystem 304. Accordingly, the processor subsystem 304 may be implemented as a number of discrete components, such as one or more programmable processors in combination with one or more logic circuits. Processor subsystem 304 may also include or be implemented as one or more integrated devices or processors. For example a processor subsystem may comprise a complex programmable logic device (CPLD).

A controller 212 also generally includes memory 308. The memory 308 is not specifically limited to memory of any particular type. For example, the memory 308 may comprise a solid-state memory device, or a number of solid-state memory devices. In addition, the memory 308 may include separate non-volatile memory 310 and volatile memory 312 portions. As can be appreciated by one of skill in the art, the memory 308 may include a read cache 316 and a write cache 320 that are provided as part of the volatile memory 312 portion of the memory 308, although other arrangements are possible. By providing caches 316, 320, a storage controller 212 can improve the speed of input/output (IO) operations between a host 112 and the data storage devices 204 comprising an array or array partition. Examples of volatile memory 312 include DRAM and SDRAM.

The non-volatile memory 310 may be used to store data that was written to the write cache of memory 308 in the event of a power outage affecting the data storage system 104. The non-volatile memory portion 310 of the storage controller memory 308 may include any type of data memory device that is capable of retaining data without requiring power from an external source. Examples of non-volatile memory 310 include, but are not limited to, compact flash or other standardized non-volatile memory devices.

A volume information block 324 may be stored in the non-volatile memory 310, although in accordance with at least some embodiments of the present invention, the volume information block 324 resides in volatile memory 312. The volume information block 324 comprises data that may be used to represent attribute and state information for master volumes, backing stores, and/or snapshots. Each master volume, backing store, and snapshot is typically associated with a different volume information block 324. The volume information block 324 is generally employed by the processor 304 to determine whether certain data is located on master volumes, backing stores, and/or snapshots and whether such data is safe to access based on the state of each. For example, the state of a master volume or backing store may be such that if data access were attempted, data corruption may occur. Accordingly, the volume information block 324 may be referenced prior to data access during an I/O operation.

The memory 308 also includes portions of the memory 308 comprising a region that provides storage for controller code 328. The controller code 328 may comprise a number of components, including an I/O application 332 comprising instructions for accessing and manipulating data. The I/O application 332 may provide the controller 212 with the ability to perform read and/or write operations of data on a storage volume and/or on a snapshot. The I/O application 332 may reference the volume information block 324 prior to executing such operations. The I/O application 332 may also employ the read and write caches 316 and 320 respectively when performing such operations.

A snapshot application 336 is an example of another application that may be included in the controller code 328. The snapshot application 336 may be adapted to create and manage snapshots of a master volume. In accordance with at least one embodiment of the present invention, the snapshot application 336 is characterized by the ability to create a writeable snapshot that represent a point-in-time but still allows for modification without disrupting data from the point-in-time. More specifically, the snapshot application 336 may be adapted to create snapshots that support controller 212 initiated read and write operations as well as host 112 initiated read and write operations.

A storage controller 212 may additionally include other components. For example, a bus and/or network interface 340 may be provided for operably interconnecting the storage controller 212 to the remainder of the data storage system 104, for example through a controller slot 208 and a bus or channel 216. Furthermore, the interface 340 may be configured to facilitate removal or replacement of the storage controller 212 in a controller slot 208 as a field replaceable unit (FRU). In addition, integral signal and power channels may be provided for interconnecting the various components of the storage controller 212 to one another.

As can be appreciated by one skilled in the art, the functionality of the snapshot application 336 may be performed on components other than the controller 212. More specifically, the snapshot functionality of the present invention could be integrated into a storage application such as an operating system of a computer or onto a switch that contains an operating system and software to implement the snapshot functionality.

Figure 4A:
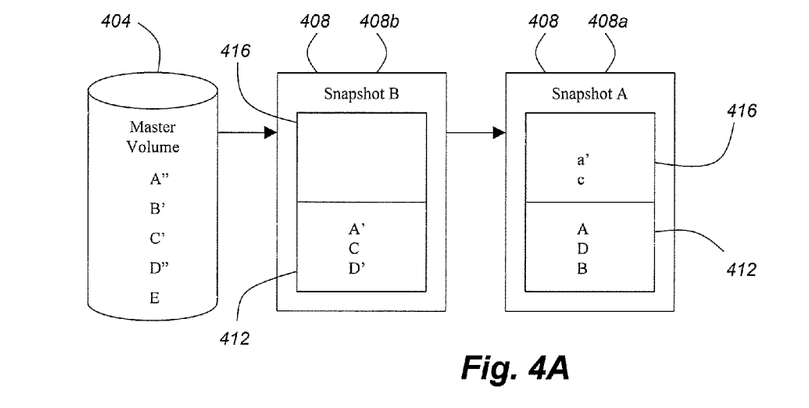
FIG. 4A is a block diagram depicting a first series of snapshots of a master volume in accordance with embodiments of the present invention.
Figure 4B:
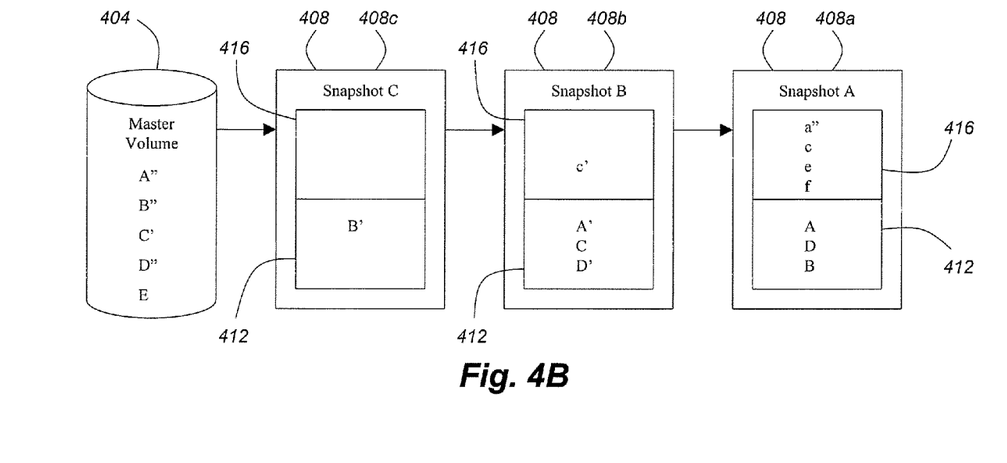
FIG. 4B is a block diagram depicting a second series of snapshots of a master volume in accordance with embodiments of the present invention.

With reference to FIGS. 4A and 4B, a series of snapshots 408 of a master volume 404 will be described in accordance with at least some embodiments of the present invention. Referring initially to FIG. 4A, a master volume 404 is depicted having two snapshots 408a and 408b associated therewith. The snapshots 408 are ordered based on their relative age where the first snapshot 408a is an older snapshot of the master volume 404 than the second snapshot 408b. Accordingly, if the I/O application 332 were searching for snapshot data (i.e., data from a specified block range) associated with the first snapshot 408a, the I/O application 332 would first search the write data area 416 of the first snapshot 408a, and if the data is not found there, the I/O application 332 would search preserved data area 412 of the first snapshot 408a. If the data is not found on the first snapshot 408a, then the I/O application 332 would search the preserved data area 412 of the second snapshot 408b. If the data is not on the preserved data area 412 of the second snapshot 408b, then the I/O application 332 would find the data on the master volume 404. It should be noted that the I/O application 332 will search the write data area 416 of the targeted snapshot 408 and not the write data areas 416 of any other snapshot 408. Thereafter, the I/O application 332 will only search the preserved data area 412 of the targeted snapshot 408 then the preserved data areas 412 of any newer snapshots 408.

Each snapshot 408 may be created with separate and distinct preserved data 412 and write data 416 areas. Changes to the snapshot 408 by a COW operation may affect the preserved data 412 while host initiated changes to the snapshot 408 may affect data in the write data area 416.

Changes in the master volume 404 made after creation of the first snapshot 408a but before creation of the second snapshot 408b are written to the preserved data area 412 of the first snapshot 408a. The preserved data area 412 of the first snapshot 408a is changed by COW operations initiated by the controller 212 and/or by deletion of a snapshot 408. The change to a snapshot 408 by a COW and/or deletion operation is performed to ensure the point-in-time image of the snapshot 408 is preserved. Otherwise, the preserved data area 412 remains unchanged and continues to represent the point-in-time that the first snapshot 408a was created, even in the event of a host 112 initiated write operation. The preserved data area 412 is used to maintain the point-in-time representation of the snapshot 408, while the write data area 416 is used to maintain normal write data that is not specifically tied to a point-in-time.

However, once the newer second snapshot 408b is created, the preserved data area 412 of the first snapshot 408a will not change, unless either the first 408a or second 408b snapshot are deleted. Any changes to the master volume 404 are otherwise reflected in the preserved data area 412 of the second snapshot 408b.

Each block range is represented by a different letter (i.e., A, B, C, etc.) and each version of the block range is represented by a variation of that letter. More specifically, the data on the master volume 404 at the point-in-time corresponding to the first snapshot 408a includes A, B, C, D, and E, whereas data on the master volume 404 at the later point-in-time corresponding to the second snapshot 408b includes A', B', C, D', and E. Since the E data block range has not been altered since the creation of either the first 408a or second 408b snapshot, it still resides on the master volume 404. The subsequent changes to a data block range on the master volume 404 are updated as A", B", or D" respectively. Host 112 initiated changes made directly to a snapshot 408 are represented by lower case letters in the write data area 416. In accordance with at least some embodiments of the present invention, all snapshot 408 have separate preserved data areas 412 and write data areas 416, but the write data area 412 is empty until a host 112 writes directly to the snapshot 408. Since the write data area 412 remains empty until a host 112 initiated write command is received, the additional space required for the snapshot 408 having this improved functionality is kept as small as possible.

As a further example, the first instance of the A data block range that resided on the master volume 404 when the first snapshot 408*a* was taken is stored in the preserved data area 412 of the first snapshot 408*a*. After the second snapshot 408*b* was created, the second instance of the same A data block (i.e., A') is maintained in the preserved data area 412 of the second snapshot 408*b*. Advantageously, a user may elect to mount the first snapshot 408*a* and write data to the same A data block range. Any host 112 initiated request like this will result in the storage of changes in the write data area 416 of the first snapshot 408*a*. A host 112 can access the newly created data (i.e., a') in the write data area 416 without altering the point-in-time representation of the corresponding A data block range stored in the preserved data area 412. One unique aspect of the present invention is that the snapshot 408 is configured to allow two different instances of data for the same data block range to reside thereon. By allowing two instances of the same data block range to exist on a single snapshot 408, a user can manipulate the snapshot data without disrupting the point-in-time representation of the snapshot 408.

Additionally, if the user decides that the changes made to the first snapshot 408*a* are not worth saving and would rather revert back to the point-in-time corresponding to the first snapshot 408*a*, then the host 112 may request to delete the data from the write data area 416, thereby leaving only the data in the preserved data area 412.

Referring now to FIG. 4B, the snapshot application 336 may create a third snapshot 408*c* of the master volume 404. The third snapshot 408*c* is assigned an "age" that is relatively younger than the first 408*a* and second 408*b* snapshot. The third snapshot 408*c* is created with separate data structures for the preserved data 412 and write data 416 much like the other snapshots 408. Upon creation of the third snapshot 408*c*, the preserved data area 412 of the second snapshot 408*b* is maintained in its current state where it contains only A', C, and D' as data, unless a snapshot is deleted thus resulting in the addition of further snapshot data. Any changes to the master volume 404 after the creation of the third snapshot 408*c* are logged in the preserved data area 412 of the third snapshot 408*c*. As with the other snapshots 408, a user may mount the third snapshot 408*c* and write data directly to the write data area 416 of the third snapshot 408*c* without altering the data in the preserved data area 412.

Figure 5:
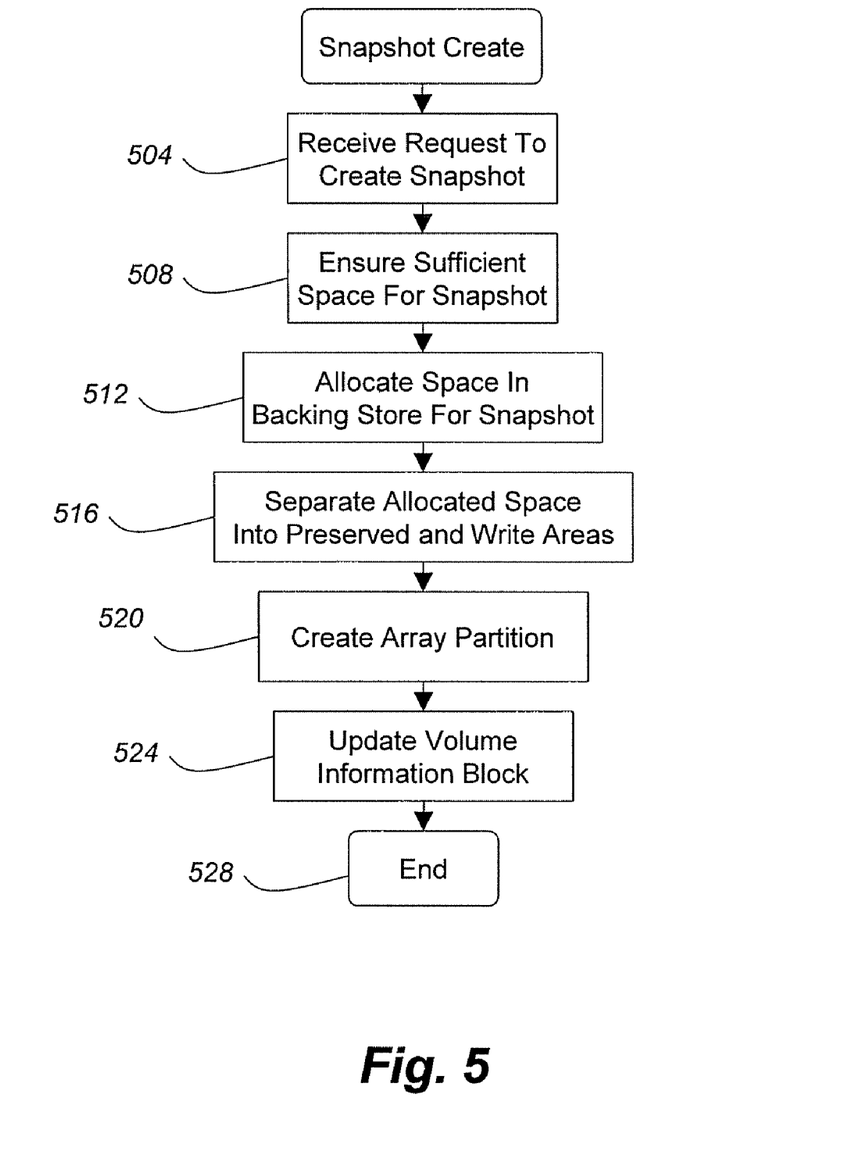
FIG. 5 is a flow chart depicting a method of creating a snapshot in accordance with embodiments of the present invention.

FIG. 5 is a flow diagram depicting a method of creating a snapshot 408 in accordance with at least some embodiments of the present invention. The method is initiated when a request to create a snapshot 408 is received at the controller 212 (step 504). The request may be received from one or both of a host 112 and administrative computer 116 in the form of an electronic message or signal.

Upon receiving the request to create a snapshot 408, the controller 212 employs the snapshot application 336 to ensure that sufficient space exists in the backing store for the snapshot 408 (step 508). The step of ensuring that sufficient space exists in the backing store may comprise determining the amount of storage available on the backing store and comparing that to a minimum amount of space required to store snapshot 408 metadata (e.g., space to keep track of the preserved data and write data). The minimum amount of space required to store a single snapshot 408 comprises the space required to keep track of the metadata associated with the preserved and write data currently held for the snapshot 408. The actual space required to retain the write and preserved data in the write data area 416 and the preserved data area 412 respectively is a function of the amount of data uniquely written to the master volume 404 and snapshot 408. The space required may increase for each additional snapshot taken of the master volume 404. If there is insufficient resources to track another snapshot, in step 508 the controller 212 may return an error message or allocate additional resources to accommodate. Resources could include memory allocation, metadata space on the backing store, etc.

After the controller 212 has ensured that there is sufficient space on the backing store, the method continues with the controller 212 allocating space on the backing store for the new snapshot 408 (step 512). In this step, the controller 212 may allocate space on the backing store used for the tracking of preserved data and write data associated with a snapshot 408. The data blocks on the backing store allocated for the snapshot 408 may be mapped to the assigned LUNs.

Once space has been allocated on the backing store for the snapshot 408, the controller 212 proceeds by separating the allocated space into two separate areas, namely a preserved data area 412 and a write data area 416 (step 516). The separation of the allocated space may occur at the block or chunk level in the data storage device 204, whereby a first range of storage addresses are allocated to the preserved data area 412 and a second range of storage addresses are allocated to the write data area 416. In accordance with at least one embodiment of the present invention, a greater amount of space is provided for the preserved data area 412 as opposed to the write data area 416. Of course, other embodiments may allocate an equal or greater amount of space to the write data area 416 as compared to the preserved data area 412. The separation of the allocated space allows for two separate data storage areas within the snapshot 408. By separating the allocated space, the snapshot 408 will be able to maintain the data corresponding to the point-in-time that the create request was received in the preserved data area 412 while allowing data to be written to the write data area 416. Accordingly, the snapshot 408 can facilitate the storage of two instances of data for the same master volume 404 block range. Space may be dynamically allocated to the preserved data area 412 and the write data area 416 on an "as needed basis." Dynamically allocated storage space is assigned from the backing store to the preserved data area 412 when a COW operation occurs. Dynamically allocated storage space is assigned from the backing store to the snapshot 408 write data area 416 when a host 112 write to a snapshot 408 occurs. However, in accordance with other embodiments of the present invention, the space may be preallocated statically.

With the preserved data area 412 and write data area 416 established on the snapshot 408, the controller 212 creates an array partition to for the new snapshot 408 (step 524). As noted above, the array partition provides access to a virtual disk drive which can read or write fixed blocks addressed by LBA. In accordance with at least some embodiments of the present invention, the array partition corresponding to the new snapshot 408 has a valid LUN number assigned to it, thereby rendering it host addressable.

Following the creation of the array partition, the controller 212 updates the volume information block 324 to reflect the creation of the new snapshot 408 (step 524). The volume information block 324 is updated to provide the I/O application 332 the ability to verify that it is safe to access the new snapshot 408 prior to executing an I/O command. Once the volume information block 324 has been updated, the method ends (step 528).

Figure 6:
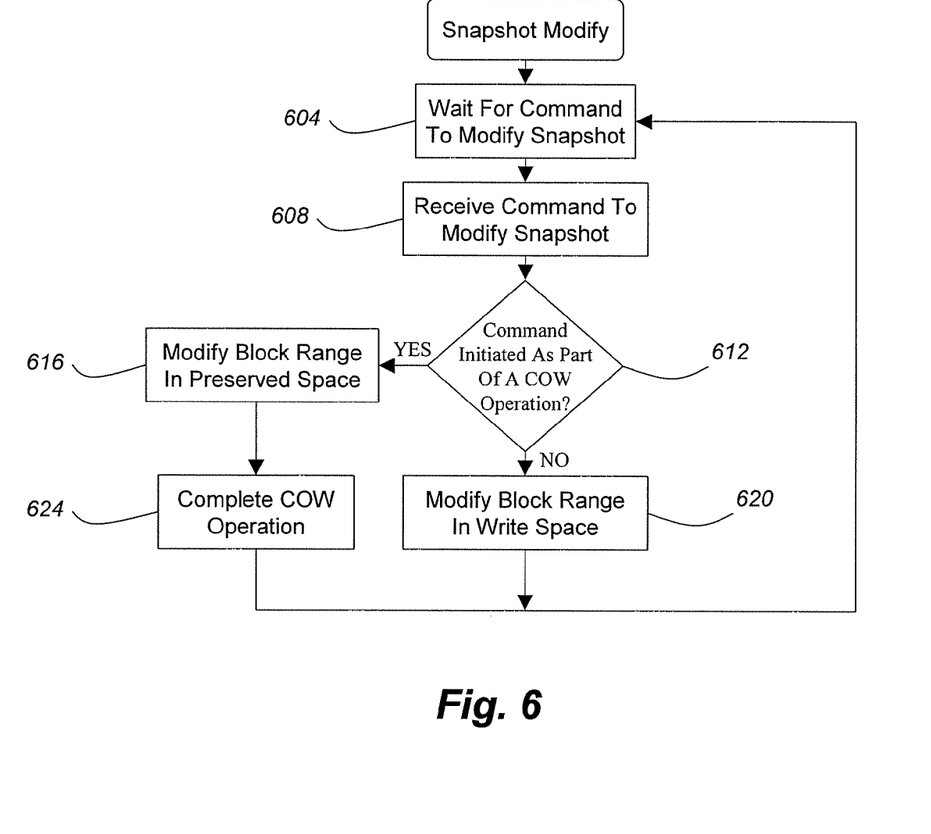
FIG. 6 is a flow chart depicting a method of modifying snapshots in accordance with embodiments of the present invention.

FIG. 6 is a flow diagram depicting a method of modifying snapshots in accordance with at least some embodiments of the present invention. Initially, the controller 212 is in a ready state, waiting to receive a request to write to a snapshot 408 (step 604). The method continues when a request to modify the snapshot data is received by the controller 212 (step 608). The request is received at the bus and/or network interface 340, which generally constitutes an input means, and is processed by the processor 304. The request may be host 112 or administrative computer 116 initiated either in response to the host 112 or administrative computer 116 requesting to modify the master volume 404 or the snapshot 408 data directly.

Upon receiving the request, the controller 212 determines if the modification in snapshot data is due to the initiation of a COW operation (i.e., is controller 212 initiated) (step 612). In other words, the controller 212 determines if the request is directed toward a modification in the master volume 404 such that original data on the master volume 404 needs to be transferred to the snapshot 408 prior to modifying the master volume 404. In the event that the modification in the snapshot 408 is required as a part of a COW operation, the controller 212 continues by changing the data in the appropriate block range of the preserved data area 412 of the newest snapshot 408 associated with the master volume 404 (step 616). After the data has been transferred from the master volume 404 to the preserved data area 412, the controller 212 continues by completing the COW operation (step 624). As part of completing the COW operation, the controller 212 makes the requested modification to the master volume 404, thus changing the data from A to A', for example.

In the event that the change to snapshot data is not due to a COW operation (i.e., is not controller 212 initiated), and is instead a direct request by a host 112 or administrative computer 116 to modify the snapshot 408, then the controller 212 continues by modifying the write data area 416 of the targeted snapshot 408 (step 620). A user may elect to alter the write data area 416 of any snapshot 408, in contrast to the COW operation that only modifies the preserved data area 412 of the newest snapshot 408. As an example, in this step the controller 212 may write a' or a" to the write data area 416 of the selected snapshot 408. Once the requested modification has been executed, the method returns to step 604, where the controller 212 awaits receipts of further commands.

Figure 7:
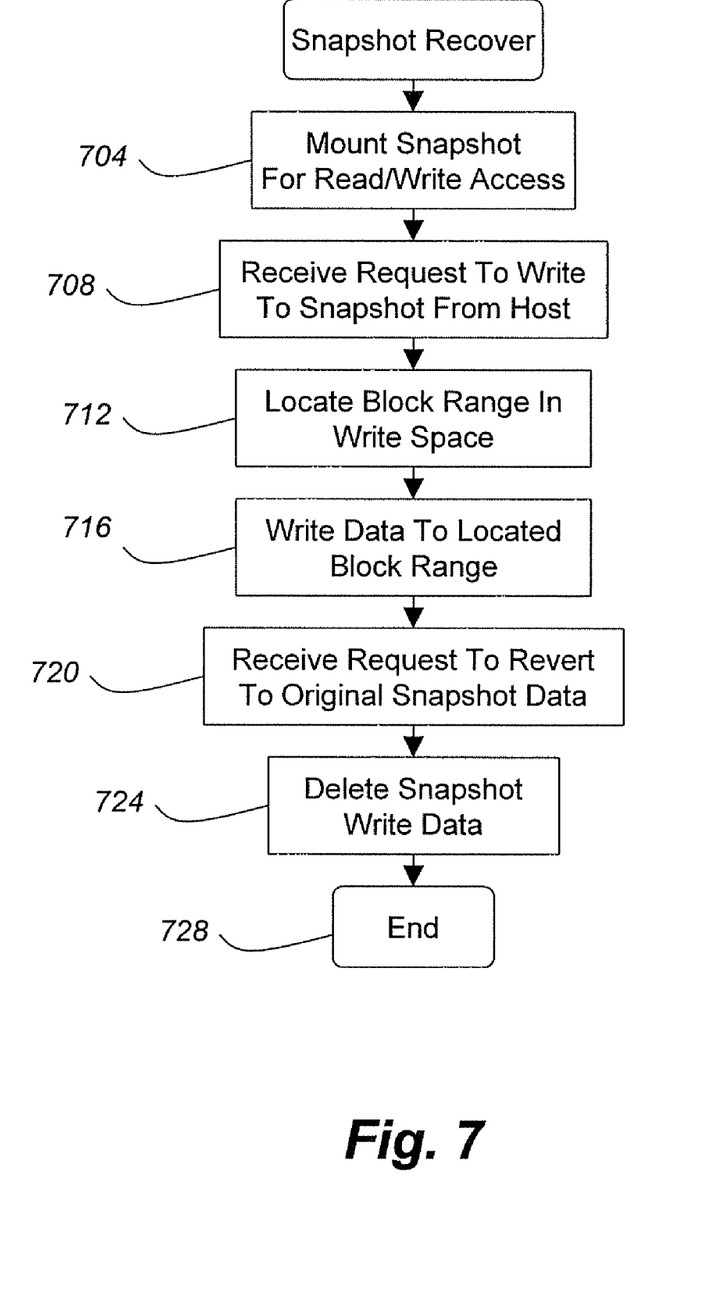
FIG. 7 is a flow chart depicting a method of recovering a snapshot in accordance with embodiments of the present invention.

FIG. 7 is a flow diagram depicting a snapshot recovery method in accordance with at least some embodiments of the present invention. The method begins when a snapshot 408 is mounted for read/write access by a host 112 or administrative computer 116 (step 704). Since the snapshot 408 is associated with an array partition having a LUN assigned thereto, the snapshot 408 is host 112 addressable. In the step of mounting the snapshot 408, a user selects the snapshot 408 from the host 112 or administrative computer 116 and accesses it using one or more applications running on the computer.

After the user has mounted the snapshot 408, the user may write changes directly to the snapshot 408 by issuing write commands to the controller 212. The write commands are received at the bus and/or network interface 340 of the controller 212 and forwarded to the processor 304 (step 708). The processor 304 then engages the snapshot application 336 to locate the block range on the snapshot 408 corresponding to the requested write command (step 712). The block range that is located by the snapshot application 336 corresponds to a block range in the write data area 416 of the snapshot, since the write command was received directly from the host 112 or administrative computer 116.

Once the appropriate data block range has been located, the data is written to the located block range within the write data area 416 (step 716). Since the write only alters the write data area 416, the data in the preserved data area 412 of the snapshot 412 remains a representation of the point-in-time that the snapshot 408 was created. Additional writes may be registered on the snapshot 408 for the same block range or for different block ranges.

After such changes have been made, the user may decide to delete the changes to the snapshot 408 and restore the snapshot 408 back to its original point-in-time representation. Upon making such a decision the user may issue a restore command that is received at the controller 212 (step 720). When the controller 212 receives a restore command, the controller 212 will employ the processor 304 and snapshot application 336 to delete the data in the write data area 416 of the mounted snapshot 408 (step 724). With the write data area 416 cleared, the only remaining snapshot data is the stored in the preserved data area 412, which is the data corresponding to the point-in-time that the snapshot 408 was created. By issuing a restore command a user is allowed to modify a snapshot 408 then quickly restore it back to its original state. Once the write data area 416 has been cleared, the method ends (step 728).

The foregoing discussion of the invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the invention in such, or in other embodiments, and with the various modifications required by their particular application or use of the invention. It is intended that the appended claims be construed to include alternative embodiments to the extent permitted by the prior art.

What is claimed is:

1. A method of managing snapshot data in a storage controller, comprising:
  at a first point-in-time, receiving a command to create a snapshot, wherein the entire snapshot is created directly from a master volume, wherein creating the snapshot comprises:
    allocating a first set of memory addresses for storage of preserved data in association with the snapshot, the preserved data initially comprising data of the master volume at the first point-in-time, wherein the preserved data is only directly writeable by the storage controller and not by a host, wherein the first set of memory addresses are alterable by a copy on write operation; and
    allocating a second set of memory addresses for storage of write data in association with the snapshot, wherein the second set of memory addresses are host writeable
  receiving a command to write data to the snapshot;
  determining whether the command is controller initiated or host initiated;
  in the event that the write command is controller initiated, writing data to a block range in the first set of memory addresses; and
  in the event that the write command is host initiated, writing data to a block range in the second set of memory addresses.

2. The method of claim 1, further comprising:
  receiving a first command from a host to modify the snapshot; and
  modifying the snapshot according to the first command received from the host.

3. The method of claim 2, further comprising:
receiving a second command to restore the entire snapshot to the first point-in-time; and
deleting data stored in the second set of memory addresses.

4. The method of claim 2, further comprising:
receiving a second command to read data from the snapshot corresponding to the first point-in-time; and
reading data from the first set of memory addresses.

5. The method of claim 1, wherein a first block range in the first set of memory addresses corresponds to a first block range in the second set of memory addresses and wherein data stored in the first block range of the first set of memory addresses corresponds to the first point-in-time and wherein data stored in the first block range of the second set of memory addresses corresponds to a second point-in-time that is later than the first point-in-time.

6. The method of claim 1, wherein at least one of the first and second sets of memory addresses are dynamically allocated.

7. The method of claim 1, further comprising:
receiving a command to read data from the snapshot;
in response to receiving the command to read data, searching the second set of memory addresses to determine if the requested data resides therein; and
in the event that the requested data does not reside in the second set of memory addresses, searching the first set of memory addresses to determine if the requested data resides therein.

8. A storage controller for managing snapshot data, comprising:
an input operable to receive instructions to create an entire snapshot directly from a master volume at a first point-in-time; and
a snapshot application operable to create a first snapshot in response to receiving the instructions, wherein the first snapshot comprises two separate data storage areas for storing different instances of data corresponding to a common data block range on the master volume, wherein a first of the two data storage areas is used to store preserved data and is alterable by a copy on write operation, wherein a second of the two data storage areas is used to store write data, wherein the preserved data initially comprised data of the master volume at the first point-in-time, wherein the preserved data is only directly writeable by the storage controller and not by a host,
wherein the input receives a command to write new data to the snapshot, wherein the snapshot application determines whether the command is controller-initiated or host-initiated, wherein in the event that the write new data command is controller initiated, the snapshot application writes the new data to the first data storage area, wherein in the event that the write new data command is host-initiated, the snapshot application writes the new data to the second data storage area.

9. The device of claim 8, wherein the preserved data is alterable by a copy on write operation and the write data is alterable by a host.

10. The device of claim 8, wherein the preserved data substantially corresponds to the first point-in-time and the write data corresponds to a second point-in-time after the first point-in-time.

11. The device of claim 8, wherein upon receiving instructions to modify the snapshot at the input, the snapshot application is further operable to modify the snapshot according to the modify command received at the input.

12. The device of claim 11, wherein after receiving the modify command and upon receiving instructions to restore the entire snapshot to the first point-in-time at the input, the snapshot application is further operable to delete data from the second of the two data storage areas.

13. The device of claim 8, further comprising an I/O application, wherein after receiving a read command, the I/O application is operable to search the second of the two data storage areas to determine if the requested data resides therein and in the event that the requested data does not reside in the second of the two data storage areas, search the first of the two data storage areas to determine if the requested data resides therein.

14. The device of claim 13, wherein in the event that the requested data does not reside in either of the two data storage areas, the I/O application is further operable to search preserved data areas of snapshots that were created after the first point-in-time.

15. A data storage device, comprising:
a snapshot having two separate data storage areas for storing different instances of data corresponding to a common data block range on a master volume, wherein a first of the two data storage areas is used to store preserved data and wherein a second of the two data storage areas is used to store write data, wherein the preserved data initially comprises data of the master volume, wherein the preserved data is only directly writeable by a storage controller and not by a host, wherein in response to receiving a command to write data to the snapshot, the data storage device determines whether the command is controller initiated or host initiated:
in the event that the write command is storage controller initiated, writing data to a block range in the first of the two data storage areas; and
in the event that the write command is host initiated, writing data to a block range in the second of the two data storage areas.

16. The device of claim 15, wherein the preserved data and write data are accessible independent of one another.

17. The device of claim 15, wherein the preserved data is alterable by a copy on write operation and the write data is alterable by a host.

18. The device of claim 15, wherein the preserved data substantially corresponds to the first point-in-time and the write data is operable to be modified at any point after the first point-in-time.

* * * * *